(12) United States Patent
Yu

(10) Patent No.: US 11,854,035 B2
(45) Date of Patent: Dec. 26, 2023

(54) METHODS, SYSTEMS, AND NON-TRANSITORY COMPUTER-READABLE RECORD MEDIA FOR PROVIDING REWARD THROUGH REWARD ACCOUNT ASSOCIATED WITH PLAYER

(71) Applicant: LINE Plus Corporation, Seongnam-si (KR)

(72) Inventor: Hyeong Jun Yu, Seongnam-si (KR)

(73) Assignee: LINE PLUS CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/233,645

(22) Filed: Apr. 19, 2021

(65) Prior Publication Data
US 2021/0326917 A1    Oct. 21, 2021

(30) Foreign Application Priority Data

Apr. 20, 2020  (KR) .................. 10-2020-0047249

(51) Int. Cl.
*G06Q 30/00*    (2023.01)
*G06Q 30/0214*    (2023.01)
(Continued)

(52) U.S. Cl.
CPC ..... *G06Q 30/0214* (2013.01); *G06Q 30/0229* (2013.01); *G06Q 30/0255* (2013.01); *G06Q 20/387* (2013.01)

(58) Field of Classification Search
None
See application file for complete search history.

(56) References Cited

U.S. PATENT DOCUMENTS

| | | | |
|---|---|---|---|
| 2009/0292595 A1* | 11/2009 | Tonnison | G06Q 30/02 707/999.005 |
| 2012/0041808 A1* | 2/2012 | Hofer | G06Q 20/387 705/14.23 |

(Continued)

FOREIGN PATENT DOCUMENTS

| | | | |
|---|---|---|---|
| JP | 2016-110270 A | 6/2016 | |
| KR | 10-2016-0004227 A | 1/2016 | |

(Continued)

OTHER PUBLICATIONS https://medium.com/pulsar/modern-enterprise-ui-design-part-2-modal-dialogs-2ccd3cc33c92—"Modern Enterprise UI design—Part 2: Modal dialogs"—Mar. 1, 2019 (Year: 2019).*

(Continued)

*Primary Examiner* — Kambiz Abdi
*Assistant Examiner* — Christopher Stroud
(74) *Attorney, Agent, or Firm* — Harness, Dickey & Pierce, P.L.C.

(57) ABSTRACT

A method, system, and non-transitory computer-readable record medium for providing a reward through a reward account connected to a player. A reward providing method includes connecting, by processing circuitry, a plurality of reward accounts registered by a user on a player, the player being installed on an electronic device, determining, by the processing circuitry, an analysis result based on content playback information, the content playback information corresponding to content output through the player, and providing, by the processing circuitry, a reward through a first reward account among the plurality of reward accounts based on the analysis result, the reward corresponding to the content output through the player.

14 Claims, 10 Drawing Sheets

(51) Int. Cl.
  *G06Q 30/0226*   (2023.01)
  *G06Q 30/0251*   (2023.01)
  *G06Q 20/38*     (2012.01)

(56) References Cited

U.S. PATENT DOCUMENTS

| | | | | |
|---|---|---|---|---|
| 2012/0174146 | A1* | 7/2012 | Richard | H04N 21/6143 725/24 |
| 2012/0316936 | A1* | 12/2012 | Jacobs | G06Q 30/02 705/14.16 |
| 2013/0246156 | A1* | 9/2013 | Murphy | G06Q 30/02 705/14.36 |
| 2015/0039440 | A1* | 2/2015 | Doumet | G06Q 30/0267 705/14.64 |
| 2016/0110746 | A1* | 4/2016 | Roundtree | G06Q 30/0206 705/7.35 |
| 2018/0012245 | A1* | 1/2018 | Parker | G06Q 30/0253 |
| 2021/0150561 | A1* | 5/2021 | Dedhia | G06Q 20/227 |

FOREIGN PATENT DOCUMENTS

| | | |
|---|---|---|
| KR | 10-1829895 B1 | 2/2018 |
| KR | 10-2009360 B1 | 8/2019 |
| KR | 10-2019-0129226 A | 11/2019 |

OTHER PUBLICATIONS

Office Action for Korean Application No. 10-2020-0047249 dated Sep. 23, 2021.

\* cited by examiner

METHODS, SYSTEMS, AND NON-TRANSITORY COMPUTER-READABLE RECORD MEDIA FOR PROVIDING REWARD THROUGH REWARD ACCOUNT ASSOCIATED WITH PLAYER

CROSS-REFERENCE TO RELATED APPLICATION(S)

This U.S. non-provisional application claims the benefit of priority under 35 U.S.C. § 119 to Korean Patent Application No. 10-2020-0047249, filed Apr. 20, 2020, the entire contents of which are incorporated herein by reference in their entirety.

TECHNICAL FIELD

Some example embodiments relate to technology for providing a reward for content consumption.

BACKGROUND

A rapid increase in the number of users of high-speed communication networks enables development of various services and diversification of service items through communication networks.

Currently, many services make revenue based on advertisements and provide better services to users based on the revenue.

An example of advertisement providing technology includes technology of providing an advertisement using a video.

Technology for providing an advertisement still operates one-dimensionally without any breakthrough since the advent of a web. Accordingly, users feel bored and leave a service or view advertisements with patience and use services that are helpful to the users.

Media companies, or media outlets, induce clicks on advertisements by overusing shocking or stimulating words to draw the interest of users. Also, a creator may create a stimulating title or thumbnail, and may induce a user to view content of the creator and view an advertisement of a content playback section.

Such inefficient advertising targeting (AD targeting) or advertising exposure (AD exposure) induction may give a user a feeling of fatigue. Also, an advertiser who executes advertising may experience difficulty in targeting advertisements properly. A creator or a publisher participating in a service operation is forcing a user to consume content in an inefficient manner to make revenue.

Although efforts are recently being made to increase AD targeting through machine learning or artificial intelligence (AI), the fundamental advertising paradigm still remains in a one-dimensional structure. To overcome this, it would be desirable to provide a mutually beneficial economic structure based on each individual's interest.

SUMMARY

Some example embodiments may provide content based on an interest of a user and may provide a reward for content consumption of the user to all participants of a platform as well as the user.

Some example embodiments may induce a user to continuously participate in a platform since the user may donate or use, as a currency, a reward acquired through content consumption within the platform.

Some example embodiments may connect a plurality of reward methods for receiving a reward for content consumption to a player installed on an electronic device of a user.

Some example embodiments may provide a reward using a specific reward method based on metadata of content consumed by a user among a plurality of reward methods connected to a player.

Some example embodiments may provide a reward using the same reward method, or similar reward methods, for contents of different platforms by installing a sub-program for a reward on an electronic device of a user.

According to an aspect of some example embodiments, there is provided a reward providing method implemented by a computer system including processing circuitry, the reward providing method including connecting, by the processing circuitry, a plurality of reward accounts registered by a user on a player, the player being installed on an electronic device, determining, by the processing circuitry, an analysis result based on content playback information, the content playback information corresponding to content output through the player, and providing, by the processing circuitry, a reward through a first reward account among the plurality of reward accounts based on the analysis result, the reward corresponding to the content output through the player.

The connecting may include displaying a user interface (UI) for registering the plurality of reward accounts.

The connecting may include setting a purpose or a content type for each of the plurality of reward accounts.

The content playback information may include a content type of the content output through the player.

The determining the analysis result may determine the analysis result based on metadata of the content output through the player.

The reward providing method may further include providing, by the processing circuitry, points to a content provider that issues the content output through the player, the points being purchased by the content provider, wherein the providing the reward may provide the reward based on the points.

The reward providing method may further include using, by the processing circuitry, the reward as a currency on a platform.

The using may include transferring at least a portion of the currency to a creator corresponding to the platform, or purchasing a product on the platform.

The reward providing method may further include granting, by the processing circuitry, a permission to the user to participate as a creator on a platform based on the reward, the reward including points.

The reward providing method may further include providing, by the processing circuitry, other content based on the analysis result and the user being a target that desires to view content, the other content corresponding to an interest of the user.

A software development kit (SDK) for providing the reward may be installed on the electronic device, and the providing the reward may provide the reward through the first reward account using the SDK in response to the content being output through the player.

The providing the reward may provide a first reward and a second reward through the first reward account, the first reward corresponding to first content provided from a first content platform, the second reward corresponding to second content provided from a second content platform, and the first content and the second content being output through the player.

According to an aspect of some example embodiments, there is provided a non-transitory computer-readable record medium storing instructions that, when executed by at least one processor, cause the at least one processor to perform the reward providing method.

According to an aspect of some example embodiments, there is provided a computer system including at least one processor configured to execute computer-readable instructions stored in a memory to connect a plurality of reward accounts registered by a user on a player, the player being installed on an electronic device, determine an analysis result based on content playback information, the content playback information corresponding to content output through the player, and provide a reward through a first reward account among the plurality of reward accounts based on the analysis result, the reward corresponding to the content output through the player.

Further areas of applicability will become apparent from the description provided herein. The description and specific examples in this summary are intended for purposes of illustration only and are not intended to limit the scope of the present disclosure.

DETAILED DESCRIPTION

Figure 1:
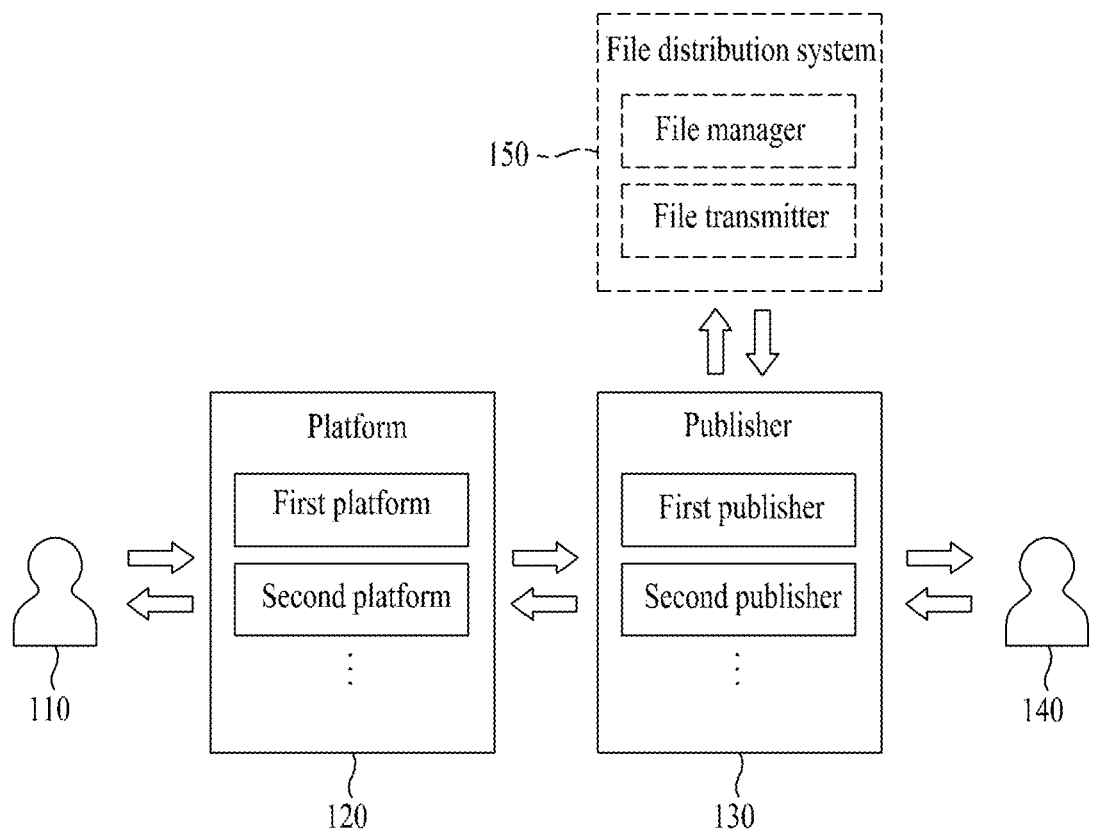
FIG. 1 illustrates an example of a content providing environment according to some example embodiments.

Some example embodiments will be described in detail with reference to the accompanying drawings. Some example embodiments, however, may be embodied in various different forms, and should not be construed as being limited to only the illustrated examples. Rather, the illustrated examples are provided so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as, or a similar meaning to, that commonly understood by one of ordinary skill in the art to which some example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned herein. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, some example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of some example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

Some example embodiments relate to technology for providing a reward for content consumption through a reward method connected to a player.

Some example embodiments described herein may connect a plurality of reward methods for receiving a reward to a player installed on an electronic device of a user and may provide a reward for content consumption using one of the plurality of reward methods.

The term "content" used herein may refer to information data, such as an advertisement, and/or any type of information data providable through the Internet or computer communication, such as, for example, movie information, news, a video, an image, and/or a community post. Here, the video may include a recorded image and/or a streaming image output through a player. That is, the content may include all objects that may be provided to a user through various types of advertising models or search engines.

Although an advertisement is described as an example of content in the following, it is provided as an example only. As described above, all contents providable to a user through the Internet or computer communication, as well as content inserted into a player, may be applied.

Also, the term "reward method" may refer to a virtual wallet connected to a player, that is a content playback device installed on an electronic device of a user, as a user account used for the user to receive a reward for content consumption.

FIG. 1 illustrates an example of a content providing environment according to some example embodiments. Here, FIG. 1 illustrates a content provider 110, a platform 120, a publisher 130, and a user 140. Here, the content provider 110 and/or the user 140 may refer to an electronic device, such as, for example, a personal computer (PC) and/or a smartphone, used by the content provider 110 and/or the user 140. That is, in FIG. 1, indicators each with an arrowhead among the content provider 110, the platform 120, the publisher 130, and/or the user 140 may represent that data may be transmitted and/or received, over a wired and/or wireless network, among an electronic device used by the content provider 110, the platform 120, and/or the publisher 130, and an electronic device used by the user 140.

The platform 120 may refer to a system that performs bidding for content provided as information data of the content provider 110, matching between targeting elements for a user to which content is to be provided, content arrangement, and billing to the content provider 110 according to providing and displaying content to the publisher 130.

The term "publisher" used herein may be interchangeably used with the term "site." Here, description using the term "site" does not exclude a possibility of implementing some example embodiments in an environment other than a general PC website connection, such as an application screen executed on an electronic device. Conversely, the term "site" may be interchangeably used with the term "publishing site" or "publisher." That is, the respective sites may correspond to individual publishers, for example, a first publisher, a second publisher, . . . , included in the publisher 130. Here, each of the individual publishers may be implemented as at one or more publisher servers. The term "site" may include any types of websites capable of displaying content and providing the content to the user 140 over a wired network and/or a wireless network, and may refer to a single webpage that constitutes a website.

Also, the expression "exposing/displaying" of content may be interpreted to include providing promotional content associated with the content provider 110, that is, information data to a visitor of a corresponding website through the publisher 130.

The publisher 130 may receive contents to be provided through a site of the publisher 130 from the platform 120 and may provide the received contents to the user 140. For example, the publisher 130 may receive information data from the platform 120, and may provide the information data to the user 140 as additional content corresponding to a video or an audio consumed by the user 140, a keyword included in conversation data such as a search query or a messenger input from the user 140, or other behavioral analysis results.

As described above, the publisher 130 may provide a path through which the user 140 directly receives content. In a general online environment, contents may be provided through a website/mobile site. Here, each of a plurality of individual platforms, for example, a first platform, a second platform, . . . , included in the platform 120 may display content through at least one individual publisher among the plurality of individual publishers, for example, the first publisher, the second publisher, . . . , included in the publisher 130. Here, each of the individual platforms may be implemented as one or more platform servers.

Referring to FIG. 1, a file distribution system 150 may be selectively used. For example, when the user 140 uses an electronic device, the file distribution system 150 may provide the user 140 with a file for installing an application associated with the publisher 130 on an electronic device. To this end, the file distribution system 150 may include a file manager configured to store and manage the file and/or a file transmitter configured to transmit the file to the electronic device of the user 140 in response to a request from the electronic device of the user 140. The application may be installed on the electronic device using the transmitted file and the application may control the electronic device to perform operations for providing content according to some example embodiments.

Some example embodiments may apply the content providing environment of FIG. 1. Here, an operator of the platform 120 may design the platform 120 such that the content provider 110 may select or input information data that is content of the content provider 110, a keyword or a category for each piece of content, and/or a target (e.g., an age, a gender, a field of interest, etc.) to which content is to be provided. The content provider 110 may upload the content to the platform 120 and may register the content to the platform 120 through bidding.

A program associated with the publisher 130 may be installed on the electronic device used by the user 140. For example, the program may be installed on the electronic device of the user 140 in a form of the application or a plug-in form, and may control the electronic device of the user 140 or a web browser installed on the electronic device of the user 140 to output information provided from the publisher 130.

Figure 2:
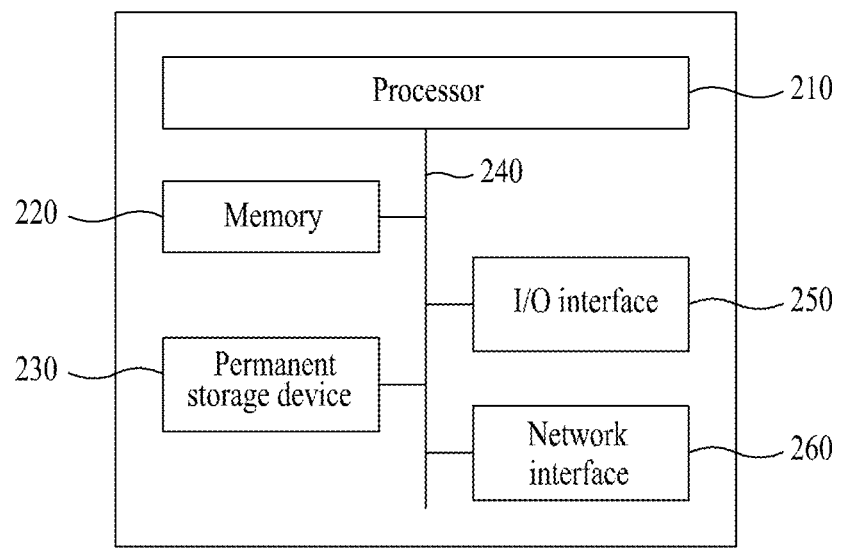
FIG. 2 illustrates an example of a computer system according to some example embodiments.

FIG. 2 is a diagram illustrating an example of a computer system according to some example embodiments. For example, a content providing system according to some example embodiments may be implemented through a computer system 200 of FIG. 2. A content providing system described herein may be a computer system that constitutes a single platform among the plurality of individual platforms of FIG. 1. According to some example embodiments, each of electronic devices used to implement, and/or perform operations described as being performed by, the content providing environment (e.g., the content provider 110, the platform(s) 120, the publisher(s) 130, the user 140, the file distribution system 150, etc.) may be the same as or similar to the computer system 200. According to some example embodiments, the file manager and/or the file transmitter of the file distribution system 150 may be implemented using a processor similar to or the same as the processor 210.

Referring to FIG. 2, the computer system 200 may include a processor 210, a memory 220, a permanent storage device 230, a bus 240, an input/output (I/O) interface 250, and/or a network interface 260 as components to perform the content providing method.

The processor 210 may include any device capable of processing a sequence of instructions or a portion thereof.

The processor 210 may include, for example, a computer processor, a processor in a mobile device or another electronic device, and/or a digital processor. The processor 210 may be included in, for example, a server computing device, a server computer, a series of server computers, a server farm, a cloud computer, a content platform, a mobile computing device, a smartphone, a tablet, and/or a set-top box. The processor 210 may connect to the memory 220 through the bus 240.

The memory 220 may include a volatile memory, a permanent memory, a virtual memory, and/or other memories configured to store information used by the computer system 200 and/or output from the computer system 200. The memory 220 may include, for example, random access memory (RAM) and/or dynamic RAM (DRAM). The memory 220 may be used to store any information, for example, state information of the computer system 200. The memory 220 may be used to store instructions of the computer system 200 that include, for example, instructions for providing content. In some example embodiments, the computer system 200 may include at least one processor 210.

The bus 240 may include a communication-based structure that enables interaction between various components of the computer system 200. The bus 240 may transport data between the components of the computer system 200, for example, between the processor 210 and the memory 220. The bus 240 may include wireless and/or wired communication media between the components of the computer system 200 and may include parallel, serial, or other topology arrangements.

The permanent storage device 230 may include components, such as a memory or another permanent storage device used by the computer system 200 to store data during a predetermined or alternatively, given extended period of time compared to, for example, the memory 220. The permanent storage device 230 may include a non-volatile main memory used by the processor 210 in the computer system 200. The permanent storage device 230 may include, for example, a flash memory, a hard disk, an optical disc, and/or other computer-readable record media.

The I/O interface 250 may include interfaces for a keyboard, a mouse, a voice instruction input, a display, and/or other input or output devices. Configuration instructions and/or input related to content providing may be received through the I/O interface 250.

The network interface 260 may include at least one interface for networks, such as, for example, a local area network and/or the Internet. The network interface 260 may include interfaces for wired and/or wireless connections. The configuration instructions, and/or information, related to content providing may be received and/or transmitted through the network interface 260.

Also, according to some example embodiments, the computer system 200 may include a number of components greater than or less than the number of components of FIG. 2. However, some components according to the related art are not illustrated in detail. For example, the computer system 200 may be implemented to include at least a portion of I/O devices connected to the I/O interface 250 and/or may further include other components, such as, for example, a transceiver, a global positioning system (GPS) module, a camera, various types of sensors, and/or a database.

Figure 3:
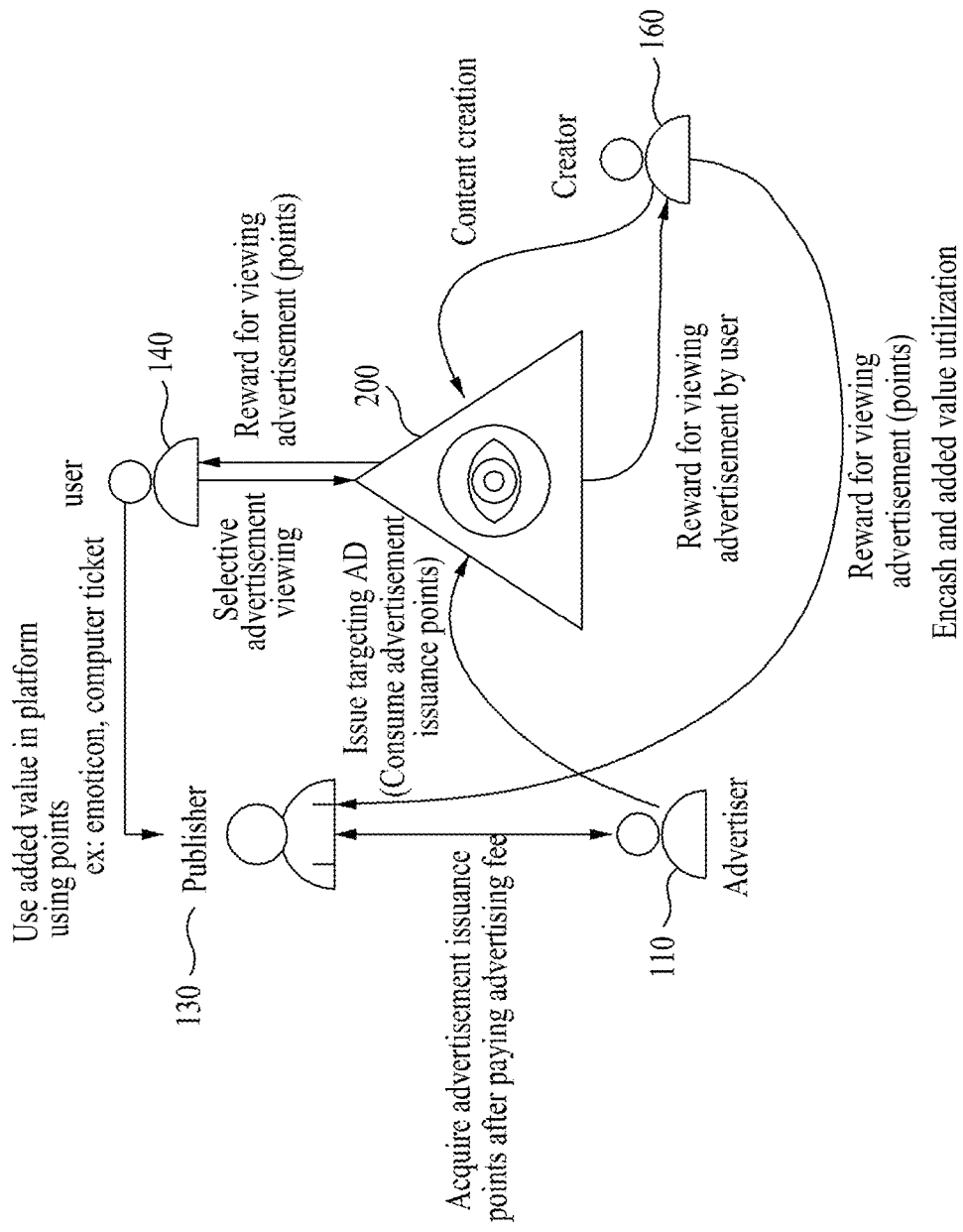
FIG. 3 illustrates an example of a user interest-based advertising architecture according to some example embodiments.

FIG. 3 illustrates an example of a user interest-based advertising architecture according to some example embodiments.

(1) The computer system 200 may provide advertisement issuance points corresponding to an advertising fee paid to the publisher 130 by an advertiser that is the content provider 110. Hereinafter, the content provider 110 may also be referred to as the "advertiser 110." The advertiser 110 may acquire, for example, purchase, advertisement issuance points from the publisher 130 and may consume the advertisement issuance points to issue a targeting advertisement.

(2) The computer system 200 may allocate a desired ratio of advertisement issuance points to the publisher 130, and a creator 160 of content displayed with an advertisement, every time the user 140 views the advertisement issued by the advertiser 110. According to some example embodiments, an electronic device used to implement the creator 160 (e.g., used to perform operations described herein as being performed by the creator 160) may be the same as or similar to the computer system 200.

(3) The computer system 200 may provide an advertisement issued by the advertiser 110 to the user 140 depending on whether the user 140 desires to view the advertisement. Here, as a reward for viewing the advertisement, the computer system 200 may pay points in predetermined (or, alternatively, desired) currency to the user 140 based on an amount of time during which the user 140 views the advertisement and/or a specific condition. The user 140 may trigger selective advertisement viewing by directly selecting whether to view the corresponding advertisement. According to some example embodiments, the computer system 200 may pay points to the user 140 as a reward by consuming at least a portion of the advertisement issuance points. According to some example embodiments, the computer system 200 may pay at least a portion of the advertisement issuance points to the user 140 as a reward.

(4) The computer system 200 may support the user 140 to use an added value in a platform with points held by the user 140. The computer system 200 may provide an environment in which points of the user 140 are available as a currency in the platform (e.g., represent value exchangeable on the platform). For example, the computer system 200 may provide a function of purchasing a sticker, a product, an emoticon, a computer ticket and/or the like in the platform, and a function of donating points to the creator 160 that participates in the platform. Also, the computer system 200 may grant the user 140 a right to participate as a content creator as well as a video consumer on the platform based on points held by the user 140. The creator 160 may also use points acquired by advertisement viewing of the user 140 as a currency in the platform. According to some example embodiments, the creator 160 may encash the points acquired based on the advertisement viewing of the user 140. According to some example embodiments, operations described herein as being performed by the creator 160 may be performed by an electronic device, such as, for example, a PC and/or a smartphone, used by the creator 160.

The aforementioned advertising architecture may reduce a number of the users 140 leaving a service, which may be beneficial to the publisher 130, and allows the user 140 to receive an economic reward. A new added value may be created through an advertising architecture that operates according to interest of the user 140, and a reward acquired through advertisement viewing of the user 140 may be used as a donation or a currency in the platform. Since the advertiser 110 displays an advertisement to the user 140 that desires to view the advertisement, it is possible to improve an advertising effect, and to clarify advertising execution or targeting.

An advertising system may be built in a structure in which the user 140 has data sovereignty by including the user 140 that desires to view an advertisement in a targeting target. Advertising market participants, including the advertiser 110, the publisher 130, the user 140, and/or the creator 160, may solve an imbalance between supply and demand for their respective markets, thereby creating a virtuous cycle of the advertising system. According to some example embodiments, the advertiser 110 and/or the creator 160 may generate content by capturing an image (e.g., sensing light from the environment and generating a digital image based on the sensed light). For example, the advertiser 110 may generate an advertisement by capturing an image (e.g., using the camera connected to the I/O interface 250), and/or the creator 160 may generate content (e.g., an image, a video, a stream, etc.) by capturing an image (e.g., using the camera connected to the I/O interface 250). The user 140 may view the advertisement and/or the content view the player.

Hereinafter, a method and system for providing a reward through a reward method connected to a player according to some example embodiments is described.

Figure 4:
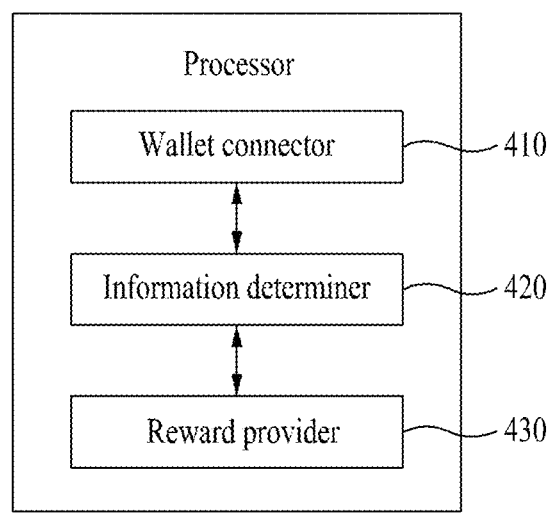
FIG. 4 illustrates an example of a processor of a computer system according to some example embodiments.
Figure 5:
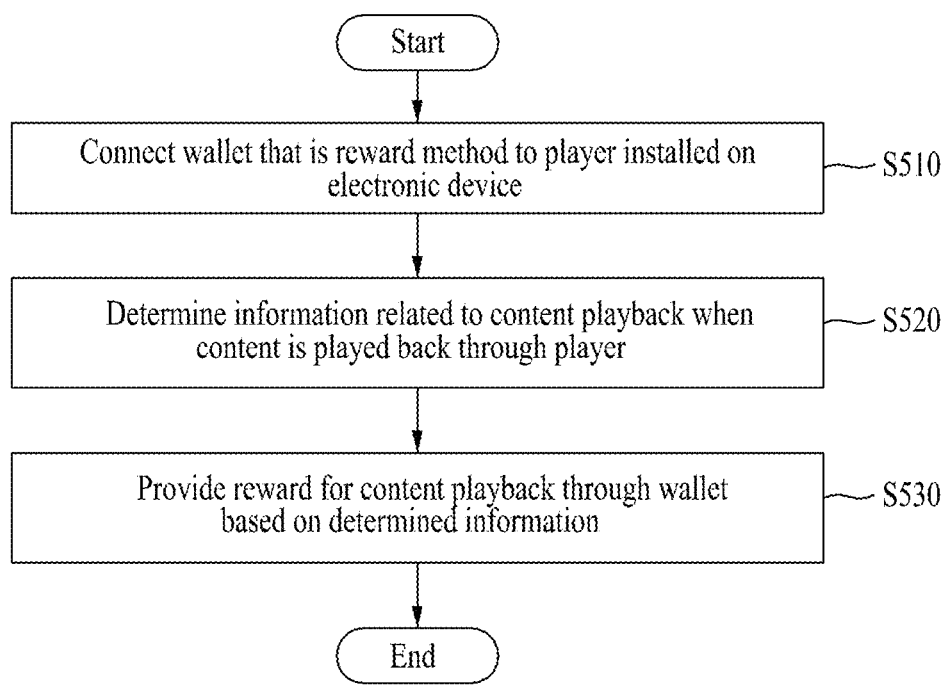
FIG. 5 is a flowchart illustrating an example of a method performed by a computer system according to some example embodiments.

FIG. 4 illustrates an example of a processor of a computer system according to some example embodiments, and FIG. 5 is a flowchart illustrating an example of a method performed by a computer system according to some example embodiments.

Referring to FIG. 4, the processor 210 of the computer system 200 may include a wallet connector 410, an information determiner 420, and/or a reward provider 430 to perform the reward providing method of FIG. 5. Depending on some example embodiments, the components of the processor 210 may be selectively included in or excluded from the processor 210. Also, depending on some example embodiments, the components of the processor 210 (e.g., the wallet connector 410, the information determiner 420 and/or the reward provider 430) may be separated or merged for functional representations of the processor 210.

The processor 210, and the components of the processor 210, may control the computer system 200 to perform operations 5510 to 5530 included in the reward providing method of FIG. 5. For example, the processor 210, and the components of the processor 210, may be configured to execute an instruction according to a code of at least one program, and/or a code of an OS, included in the memory 220.

Here, the components of the processor 210 may be representations of different functions performed by the processor 210 in response to an instruction provided from a program code stored on the computer system 200. For example, the wallet connector 410 may be used as a functional representation of the processor 210 for controlling the computer system 200 to connect a wallet to a player.

The processor 210 may read an instruction from the memory 220 to which instructions associated with control of the computer system 200 are loaded. In this case, the read instruction may include an instruction for controlling the processor 210 to perform the following reward providing method. The following reward providing method may be performed in an order different from the illustrated order. A portion of operations 5510 to 5530 included in the reward providing method may be omitted. Alternatively, an additional process may be further included.

Referring to FIG. 5, in operation 5510, the wallet connector 410 may connect a user reward method (hereinafter, referred to as a wallet and/or account) to a player installed on the electronic device of the user 140. In response to execution of the player on the electronic device through interaction with the player installed on the electronic device, the wallet connector 410 may display a user interface (UI) (e.g., a wallet registration UI) for registering a wallet of the user 140 on the player. The wallet connector 410 may register a wallet on the player by receiving a user request through a wallet registration UI and connecting account information included in the user request to the player. The wallet connector 410 may register and connect a plurality of wallets on the player for each user 140, and may activate at least one of the wallets connected to the player as a reward method for receiving a reward in response to the user request.

The wallet connector 410 may classify and set the usage by the user 140 for each of the wallets connected to the player. The user 140 may connect a plurality of accounts on the player and may set a purpose for each account, for example, an account for receiving a reward for viewing an advertisement, an account for withdrawing cash, an account for viewing paid content, and/or an account for donation. The wallet connector 410 may match and set a wallet based on a category, for example, a type of content (e.g., set a content type for each wallet/account). For example, when accounts A, B, and C are connected to the player, the wallet connector 410 may set the account A as a reward method for viewing a public interest campaign video, may set the account B as a reward method for viewing a general advertising video, and may set the account C as a reward method for viewing an information delivery video. Therefore, the wallet connector 410 may match and set the plurality of wallets connected to the player by purpose or by content type.

In operation 5520, when content, for example, an advertisement is played back through the player, the information determiner 420 may determine an analysis result about information (hereinafter, playback information) related to advertisement playback on the electronic device. The information determiner 420 may determine an analysis result about playback information by directly analyzing playback information received from the electronic device or by receiving an analysis result about playback information by the electronic device from the electronic device.

For example, when an advertisement is played back through the player, the electronic device of the user 140 may provide playback information, including an identifier for identifying the played back advertisement and/or an actual time at which the advertisement is played back through the player, to a platform, that is, the information determiner 420. Therefore, the information determiner 420 may determine whether a type of an advertisement viewed by the user 140, an advertisement viewing time of the user 140, and/or advertisement viewing of the user 140 meets a preset or alternatively, given specific condition, based on the playback information received from the electronic device.

The information determiner 420 may analyze information in which the user 140 of the electronic device is interested based on an advertising video, that is, an advertisement being played back through the player and may appropriately arrange an advertisement corresponding to the interest of the user 140 for the user 140 based on the analysis result. Also, the information determiner 420 may forward at least a portion of the playback information received from the electronic device to at least one participant of the content provider 110 and/or the creator 160 associated with the corresponding advertisement. Here, the content provider 110 and/or the creator 160 may analyze the interest of the user 140 based on the transferred information, and may use the analysis result for advertising targeting (AD targeting) and/ or content creation. According to some example embodiments, the processor 210 may provide content to the user 140 corresponding to an interest of the user based on the analysis result in response to determining the user 140 desires to view content (e.g., based on an input and/or selection by the user 140) and/or the user 140 is a target (e.g., the interest of the user matches a subject of the content).

In operation 5530, the reward provider 430 may provide a reward for advertisement playback through a wallet connected to the player based on a result of analyzing playback information of the user 140. When an advertisement viewing time of the user 140, and/or an advertisement viewed by the user 140, meets a specific condition based on information related to the advertisement playback through the player, the reward provider 430 may pay a reward to the user 140. For example, the reward provider 430 may provide, that is, pay the reward only when the user 140 views the advertisement for at least a predetermined (or, alternatively, desired) amount of time or ratio to (e.g., a specific percentage of) a total playback time.

The reward provider 430 may provide a reward for advertisement playback of the user 140 through a wallet (e.g., account) corresponding to an analysis result among a plurality of wallets (e.g., accounts) connected to the player based on the analysis result about playback information of the user 140. For example, the reward provider 430 may provide a reward for advertisement playback of the user 140 through a wallet (e.g., account) pre-matched to a type of an advertisement played back through the player among the plurality of wallets (e.g., accounts) connected to the player. The information determiner 420 may analyze a type of a corresponding advertisement based on metadata of the advertisement played back through the player and, in response thereto, the reward provider 430 may provide a reward for viewing the corresponding advertisement through a wallet (e.g., account) matched to a type of the advertisement viewed by the user 140 among the plurality of wallets (e.g., accounts) connected to the player. For example, when content is played back through the player and the content is determined to correspond to a public interest campaign video based on metadata of the played back content, the reward provider 430 may provide a reward for corresponding content to the account A that is a reward method for viewing the public interest campaign video.

The reward provider 430 may transfer, to the creator 160 selected by the corresponding user 140, points corresponding to at least a portion of the reward acquired by the user 140 through advertisement viewing in a form of donation. The donation may include a regular donation method and a temporary donation method. The regular donation method may automatically count points according to a repetition cycle (monthly, quarterly, etc.) and may allocate a predetermined (or, alternatively, desired) ratio or points to the creator 160 selected by the user 140. The temporary donation method may allocate points desired by the user 140 at a point in time desired by the user 140.

The reward provider 430 may provide a purchase function for a sticker or a product within the platform, in addition to the donation, using the reward acquired by the user 140 through advertisement viewing. In addition to donation or product purchase, an added value may be created based on many service properties. Regardless of service properties, the platform may commonly provide the reward based on interest of the user 140 and may maintain the interest of the user 140.

Through the interest-based structure, a number of creators 160 participating in the platform may increase according to a decrease in a number of the users 140 leaving a corresponding service and a demand of the advertiser 110 that desires AD targeting may also increase. From a platform standpoint, excessive advertising traffic and cost may be reduced, and traffic may increase within a prediction range.

The computer system 200 may provide a reward using the same reward method, or similar reward methods, for contents provided from different content providers 110. A player installed on the electronic device of the user 140 may be an application associated with the computer system 200 and may be an application associated with a separate platform different from the computer system 200.

Figure 6:
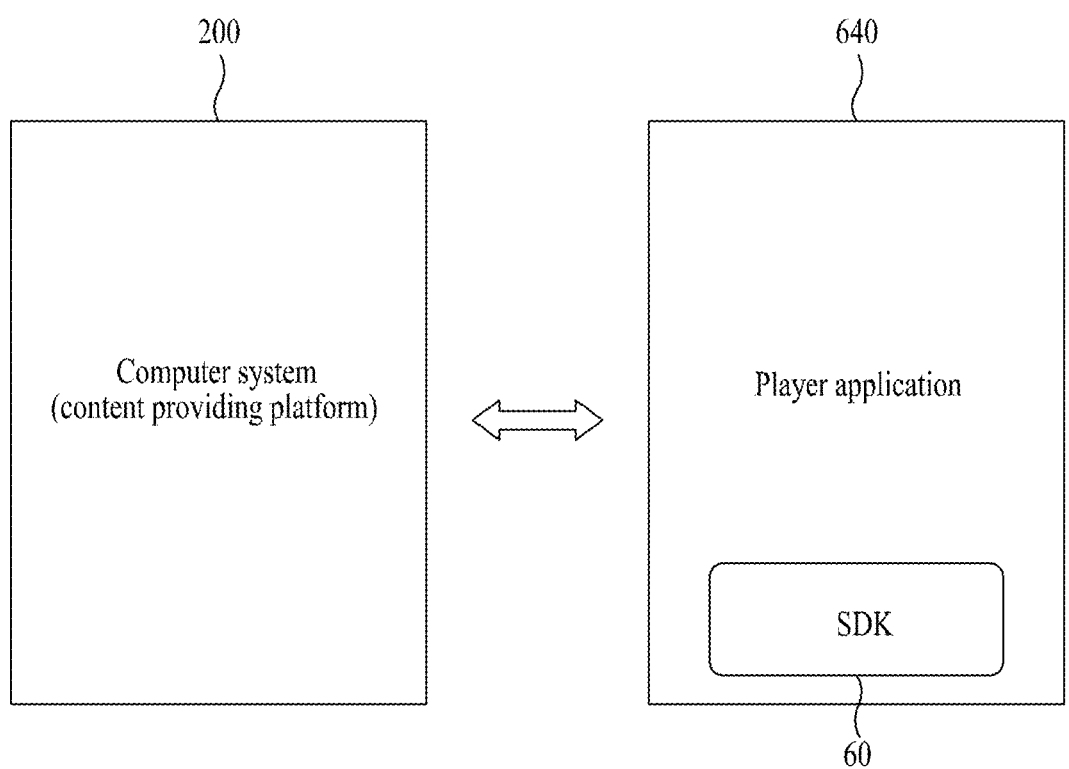
FIG. 6 illustrates an example of an environment in which a reward is provided for contents of different platforms using a software development kit (SDK) according to some example embodiments.

To use the same reward method, or similar reward methods, a sub-program for providing a reward for content playback may be installed on the electronic device of the user 140. Referring to FIG. 6, although a player application 640 installed on the electronic device of the user 140 may be an application associated with another platform irrelevant to, and/or different from, the platform of the computer system 200, a reward for content playback may be provided using the same reward method, or a similar reward method, in the case of playing back content provided from the other platform different from that of the computer system 200 in a state in which an SDK 60 manufactured including a reward function of the computer system 200 is installed. For example, the SDK 60 may be provided in a plug SDK form and may be manufactured in an in-app form in the player application 640 by using a plug SDK during a process of manufacturing the player application 640. The player application 640 in which the SDK 60 is installed may include the reward function of FIG. 5.

For example, when content A provided from a content platform I is played back and then content B provided from a content platform II (e.g., a content platform different from the content platform I) is played back through the player application 640 in which the SDK 60 is installed, a reward for playing back the content B may be provided through the same reward method as, or a similar reward method to, a reward method used for a reward provided for playing back the content A. According to some example embodiments, the SDK 60 may enable the player application to communicate with a plurality of different content platforms to facilitate rewards based on viewing content on the different content platforms to be provided through only one reward method.

Therefore, although the user 140 views content of a platform different from the platform of the computer system 200, if the SDK 60 is installed in the player application 640, a reward function according to some example embodiments may be implemented in the same manner, or similar manners, by interacting with the computer system 200 through the SDK 60.

FIGS. 7 to 10 illustrate examples of a process of connecting a player and a wallet according to some example embodiments.

Figure 7:
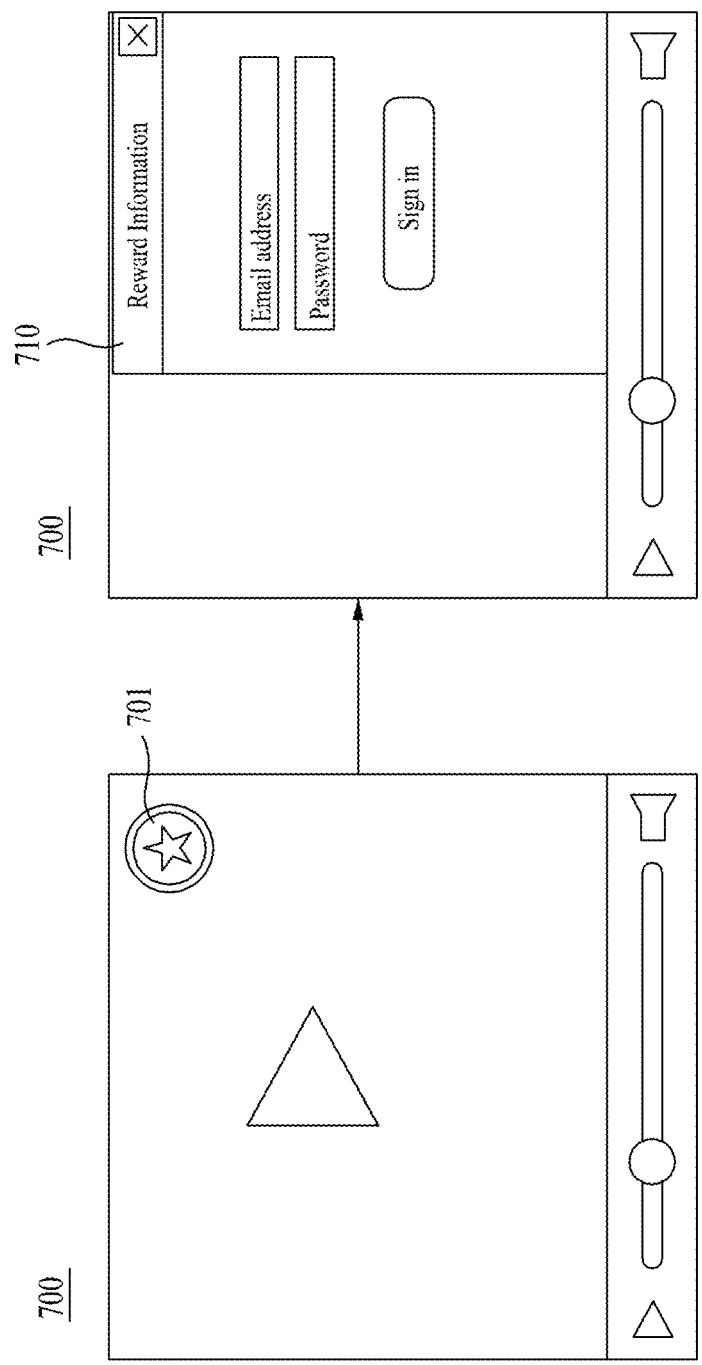
FIGS. 7 to 10 illustrate examples of a process of connecting a player and a wallet according to some example embodiments.

Referring to FIG. 7, a wallet UI 701 for creating a wallet on a player or managing the created wallet may be included in a player screen 700. The processor 210 may provide a reward information screen including wallet information created by the user 140, in response to an input of the wallet UI 701 from the user 140 on the player screen 700.

The processor 210 may determine whether to create the wallet of the user 140 and, in response to an input of the wallet UI 701 from the user 140 in a state in which the wallet is not created, may provide a subscription screen 710 and may induce subscription and wallet creation using account information of the user 140 (e.g., user identification, such as an email address, a password, etc.).

Figure 8:
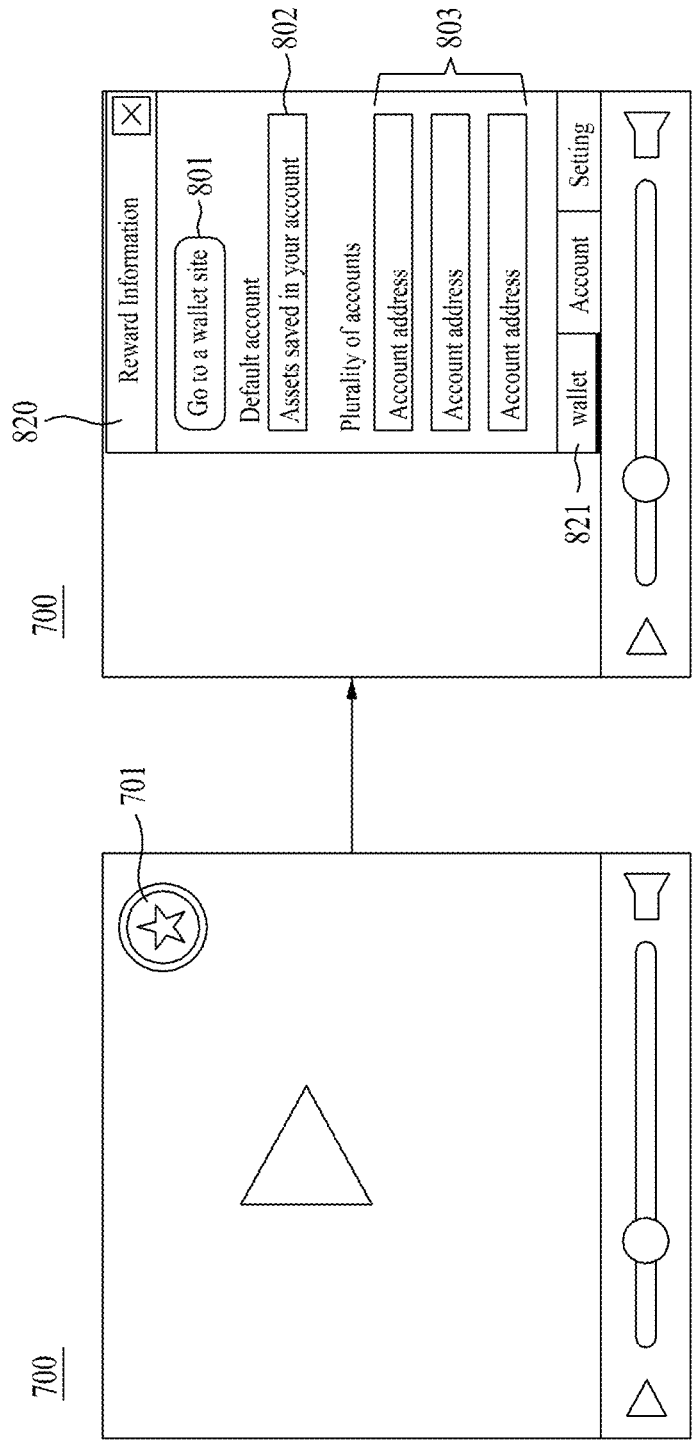

Referring to FIG. 8, in response to an input of the wallet UI 701 from the user 140 in a state which the wallet is created, the processor 210 may provide a reward information screen 820 that includes wallet information created by the user 140. The reward information screen 820 may include a plurality of pages. A wallet information screen 821 corresponding to one of the plurality of pages may include a "go to a wallet site" UI 801 for directing to an asset management site of a corresponding wallet in association with a wallet of the user 140, default account information 802 set as a wallet for receiving a reward for content consumption, and a list of other accounts 803 set as a wallet for each purpose (e.g., different purposes) or for each content type (e.g., different content types). The user 140 may verify account information of a wallet available as a reward method through the wallet information screen 821. For example, the user 140 may verify an account for receiving a reward for viewing an advertisement, an account for withdrawing cash, an account for viewing paid content, and/or an account for donation. In addition, the user 140 may classify a reward for viewing an advertisement based on a type of the advertisement and may verify a reward account set for each advertising type to receive the reward.

Figure 9:
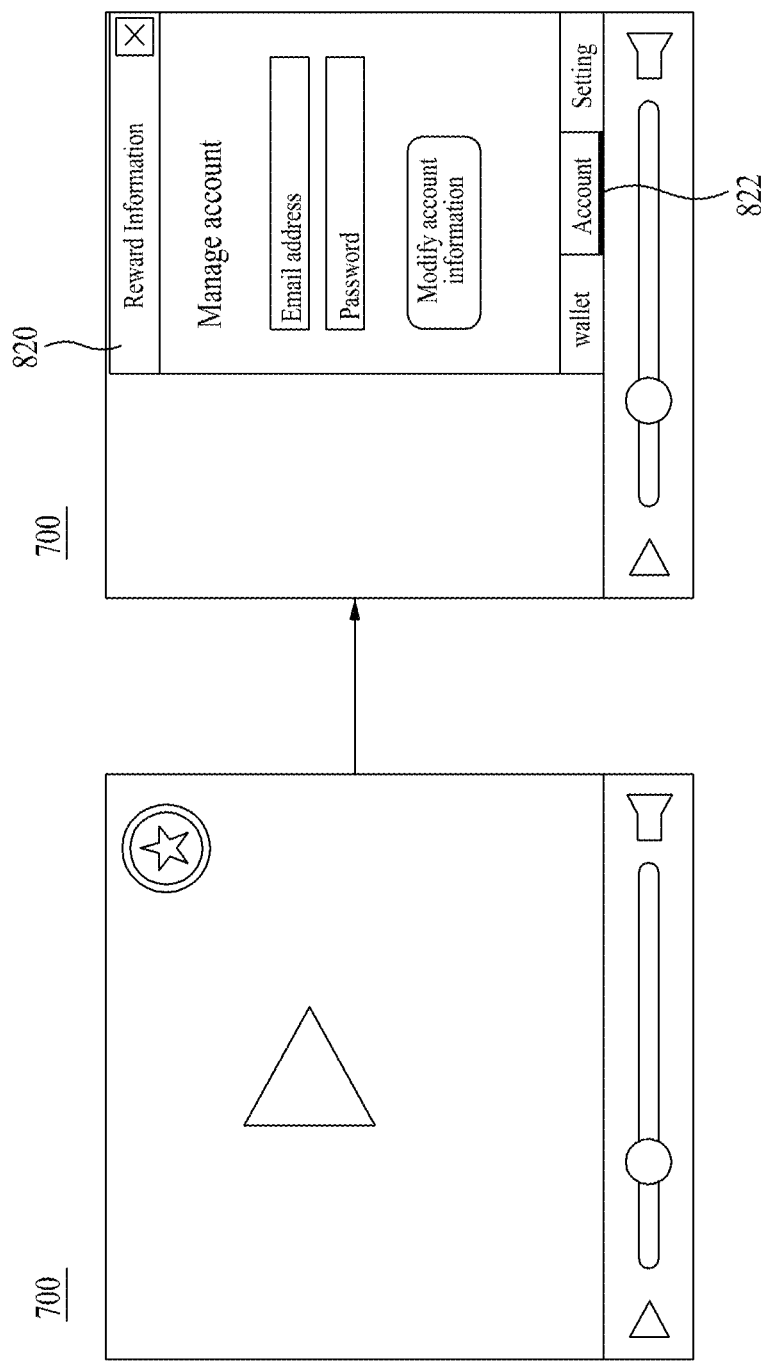

Referring to FIG. 9, a reward information screen 820 may include an account modification screen 822 for modifying account information of the user 140. The user 140 may modify account information related to a wallet of the user 140 through the account modification screen 822.

Figure 10:
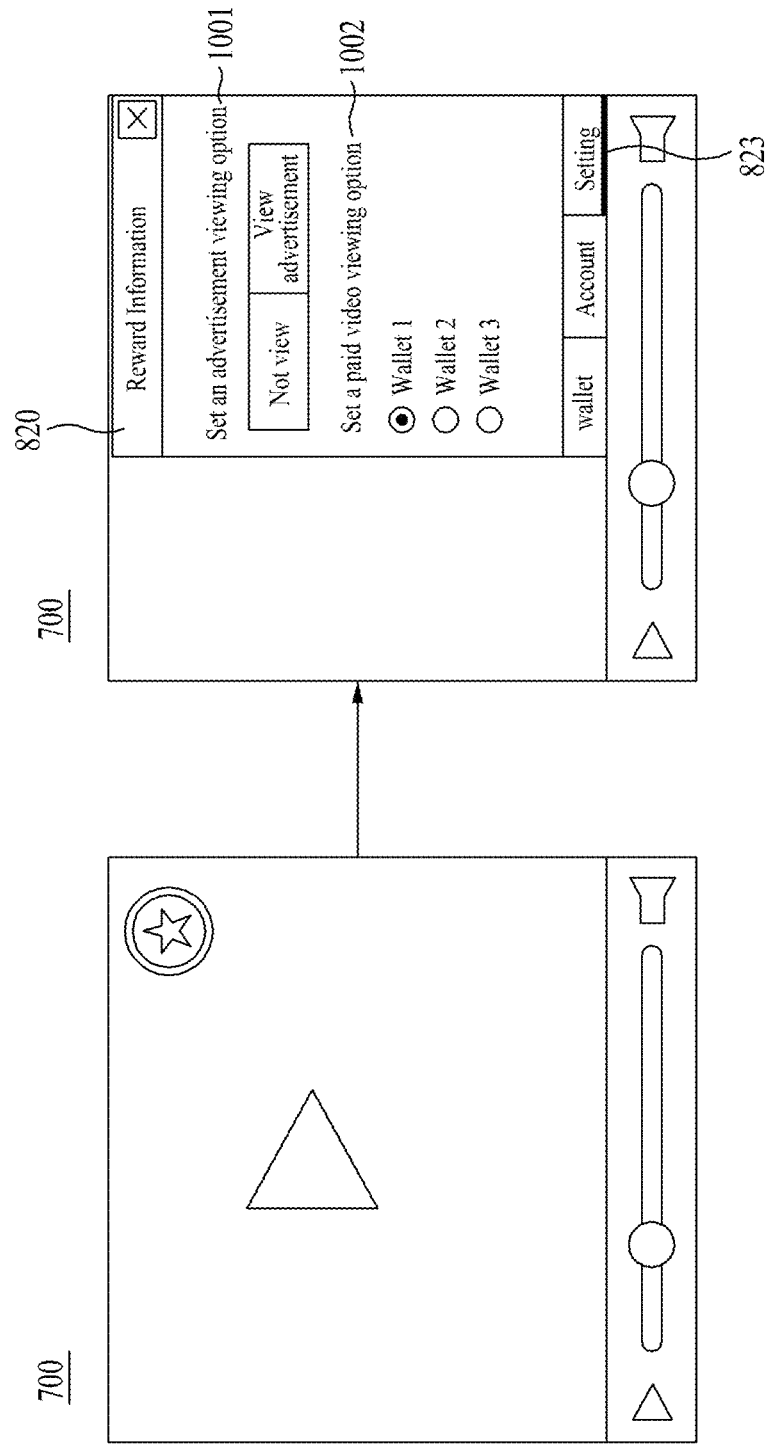

Referring to FIG. 10, the reward information screen 820 may include an option setting screen 823 for setting option information related to a reward. The option setting screen 823 may include a "set an advertisement viewing option" UI 1001 for setting whether to view a corresponding advertisement using a player and/or a "set a paid video viewing option" UI 1002 for setting a wallet to be used as a payment method when viewing a paid video. In addition, the option setting screen 823 may include an interface for setting a purpose or a content type for each wallet with respect to a plurality of wallets connected to the player. The user 140 may set whether to view an advertisement, an account for viewing a paid video, an account for withdrawing cash, an exclusive account for donation, and/or may also set a plurality of wallets for each purpose or for content type.

According to some example embodiments, it is possible to increase an added value of a platform by providing content based on interest of a user and by providing a reward for content consumption of the user to all participants of the platform as well as the user. In particular, according to some example embodiments, it is possible to connect a plurality of reward methods for receiving a reward to a player installed on an electronic device of a user, to provide a reward for content consumption using one of the plurality of reward methods, and/or to induce the user to continuously participate in a platform since the user may donate or use, as a currency, a reward acquired through content consumption within the platform. Also, according to some example embodiments, it is possible to provide a reward using the same reward method, or similar reward methods, for contents of different platforms by installing a sub-program for a reward on an electronic device of a user.

Conventional devices and methods for providing advertisements to users include separate approaches for different parties to an advertising structure. These separate approaches reflect the conflicting interests of the different parties. For example, media companies seek high numbers of advertisement views (e.g., clicks) through excessive use of shocking and/or stimulating words, resulting in user fatigue. Also, content creators and/or publishers provide excessive numbers of advertisements to users that are undesired by the users and/or insufficiently targeted to interests of the users. As a result, fewer users desire to view advertisements and/or the advertisements viewed by the users are ineffective, and thus, the conventional devices and methods for providing advertisements to users are excessively costly from the perspectives of at least the users and the advertisers.

However, according to some example embodiments, improved devices and methods are provided in which a comprehensive approach is applied to the different parties to the advertising structure. For example, a reward currency may be provided to the parties, including the users, as an incentive for correcting an imbalance between the supply and demand of advertisements across the advertising structure. As the number of users decreases, demand from advertisers may increase and the number of creators may increase in response to the incentives provided by the reward currency. Accordingly, the improved devices and methods overcome the deficiencies of the conventional devices and methods to increase the desirability and effectiveness of advertisements, and/or reduce advertising costs.

According to some example embodiments, operations described herein as being performed by the computer system 200, the processor 210, the wallet connector 410, the information determiner 420, the reward provider 430, the content provider 110, the platform(s) 120, the publisher(s) 130, the user 140, the file distribution system 150 and/or the creator 160 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The systems and/or apparatuses described above may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The above-described methods according to some example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A reward providing method implemented by a computer system including processing circuitry, the reward providing method comprising:
   connecting, by the processing circuitry, a plurality of reward accounts registered by a user on a player, the plurality of reward accounts including a first reward account and a second reward account, the first reward account being set to receive a first reward in response to a first determination that content output through the player is a first content type and the second reward account being set to receive a second reward in response to a second determination that the content output through the player is a second content type, and the player being installed on an electronic device;
   determining, by the processing circuitry, an analysis result based on content playback information, the content playback information corresponding to the content output with corresponding media through the player, the media being created by at least one first creator, and the content being issued by at least one content provider, wherein the determining comprises determining a content type of the content based on metadata of the content included in the content playback information as the analysis result;
   providing, by the processing circuitry, the first reward to the first reward account in response to the first determination that the content is the first content type and a second reward to the second reward account in response to the second determination that the content is the second content type based on the analysis result, the first reward and the second reward corresponding to the content output through the player; and
   providing, by the processing circuitry, a first portion of points to the at least one first creator based on the analysis result, the points being purchased by the at least one content provider,
   wherein the connecting the plurality of reward accounts is performed based on a selection of an account user interface (UI), the account UI being overlayed on a player screen of the player, and the plurality of reward accounts being registered by the user through the account UI, a respective content type being set for each of the plurality of reward accounts by the user through the account UI to receive a reward for playing content having the respective content type, and thereby the first content type being set for the first reward account to receive the first reward by the account UI and the second content type being set for the second reward account to receive the second reward by the account UI,
   wherein
      a software development kit (SDK) for providing the first reward and the second reward is installed on the electronic device, and
      the providing the first reward and the second reward provides the first reward to the first reward account using the SDK in response to the content being output through the player, and
   wherein the providing the first reward provides a third reward and a fourth reward to the first reward account, the third reward corresponding to first content provided from a first content platform, the fourth reward corresponding to second content provided from a second content platform, and the first content and the second content being output through the player.

2. The reward providing method of claim 1, wherein the connecting comprises displaying the account UI for registering the plurality of reward accounts.

3. The reward providing method of claim 1, wherein the connecting comprises setting a purpose for each of the plurality of reward accounts.

4. The reward providing method of claim 1, further comprising:
   providing, by the processing circuitry, the points to the at least one content provider,
   wherein the providing the first reward and the second reward provides the first reward and the second reward based on a second portion of the points.

5. The reward providing method of claim 1, further comprising:
   using, by the processing circuitry, the first reward as a currency on a platform.

6. The reward providing method of claim 5, wherein the using comprises:
   transferring at least a portion of the currency to a second creator corresponding to the platform; or
   purchasing a product on the platform.

7. The reward providing method of claim 1, further comprising:

granting, by the processing circuitry, a permission to the user to participate as a third creator on a platform based on the first reward, the first reward including a third portion of the points.

8. The reward providing method of claim 1, further comprising:
providing, by the processing circuitry, other content based on the analysis result and the user being a target that desires to view content, the other content corresponding to an interest of the user.

9. A non-transitory computer-readable record medium storing instructions that, when executed by at least one processor, cause the at least one processor to perform the reward providing method of claim 1.

10. A computer system comprising:
at least one processor configured to execute computer-readable instructions stored in a memory to
connect a plurality of reward accounts registered by a user on a player, the plurality of reward accounts including a first reward account and a second reward account, the first reward account being set to receive a first reward in response to a first determination that content output through the player is a first content type and the second reward account being set to receive a second reward in response to a second determination that the content output through the player is a second content type, and the player being installed on an electronic device,
determine an analysis result based on content playback information, the content playback information corresponding to the content output with corresponding media through the player, the media being created by at least one first creator, and the content being issued by at least one content provider, wherein the determination comprises determination of a content type of the content based on metadata of the content included in the content playback information as the analysis result,
provide the first reward to the first reward account in response to the first determination that the content is the first content type and a second reward to the second reward account in response to the second determination that the content is the second content type based on the analysis result, the first reward and the second reward corresponding to the content output through the player, and
provide a first portion of points to the at least one first creator based on the analysis result, the points being purchased by the at least one content provider,
wherein the connection of the plurality of reward accounts is performed based on a selection of an account user interface (UI), the account UI being overlayed on a player screen of the player, and the plurality of reward accounts being registered by the user through the account UI, a respective content type being set for each of the plurality of reward accounts by the user through the account UI to receive a reward for playing content having the respective content type, and thereby the first content type being set for the first reward account to receive the first reward by the account UI and the second content type being set for the second reward account to receive the second reward by the account UI,
wherein
a software development kit (SDK) for providing the first reward and the second reward is installed on the electronic device, and
the at least one processor is configured to provide the first reward to the first reward account using the SDK in response to the content being output through the player, and
wherein the at least one processor is configured to provide a third reward and a fourth reward to the first reward account, the third reward corresponding to first content provided from a first content platform, the fourth reward corresponding to second content provided from a second content platform, and the first content and the second content being output through the player.

11. The computer system of claim 10, wherein the at least one processor is configured to display the account UI for registering the plurality of reward accounts.

12. The computer system of claim 10, wherein the at least one processor is configured to set a purpose for each of the plurality of reward accounts.

13. The computer system of claim 10, wherein the at least one processor is configured to provide the points to the at least one content provider; and
provide the first reward and the second reward based on a second portion of the points.

14. The computer system of claim 10, wherein the at least one processor is configured to:
use the first reward as a currency on a platform to,
transfer at least a portion of the currency to a second creator corresponding to the platform, or
purchase a product on the platform.

* * * * *